United States Patent Office 3,086,058
Patented Apr. 16, 1963

3,086,058
ETHYLENICALLY-UNSATURATED
FLUORINATED THIOLS
John F. Harris, Jr., Wilmington, Del., assignor to E. I. du Pont de Nemours and Company, Wilmington, Del., a corporation of Delaware
No Drawing. Filed June 19, 1959, Ser. No. 821,361
3 Claims. (Cl. 260—609)

This invention relates to new compositions and to their preparation.

Fluorine-containing ethylenically-unsaturated thiols are versatile chemical intermediates, but their full potential has not been realized because of their relative inaccessibility. An object of this invention is, consequently, provision of a new method for producing ethylenically-unsaturated fluorinated thiols.

Another object is provision of certain novel ethylenically-unsaturated fluorinated thiols.

In its process aspects, this invention provides methods for preparing fluorinated alkenylthiols by subjecting to ionizing radiation of an energy above 100 e.v. (electron volts) a mixture of hydrogen sulfide and a polyfluoroalkylacetylene of general formula $R_fC \equiv CR$, in which R is hydrogen or polyfluorocarbyl and $R_f$ is polyfluorocarbyl. It also provides certain new polyfluorinated alkenylthiols corresponding to the general formula $R_fCH=C(SH)Y$, wherein Y is hydrogen or polyfluorocarbyl and $R_f$ is polyfluorocarbyl. It may be noted that "polyfluoro" as employed herein indicates that the compound in question contains at least two fluorines.

In a convenient way for carrying out the instant process, a steel pressure reactor is charged at ambient temperatures with hydrogen sulfide and polyfluoroalkylacetylene, and the charge is then subjected to ionizing radiation having an energy of at least 100 e.v. Energies of 0.1 mev. and higher are preferred. The desired product is then separated from the reaction mixture by distillation or other method known to those skilled in the art.

Suitable ionizing radiation includes radiation in the form of particle radiation and radiation in the form of ionizing electromagnetic radiation.

Particle radiation refers to the stream of particles such as electrons, protons, neutrons, α-particles, deuterons, β-particles, and the like. The charged particles may be accelerated by means of a suitable voltage gradient, using such devices as a cathode ray tube, a resonant cavity accelerator, a Van der Graaff accelerator, a betatron, or the like, as is well known to those skilled in the art. Neutron radiation may be produced by suitable nuclear radiations, e.g., bombardment of a berylium target with deuterons or α-particles. In addition, suitable radiation may be obtained from an atomic pile, from radioactive isotopes, or from other natural or artificial radioactive materials.

Ionizing electromagnetic radiation refers to radiation of the type produced when a metal target, e.g., gold, tungsten, etc., is bombarded by electrons possessing appropriate energy. Such radiation is conventionally termed X-ray. In addition to X-rays, suitable ionizing electromagnetic radiation may be obtained from a nuclear reactor ("pile"). Radiation of this type is commonly termed gamma ray.

The intensity of the ionizing radiation as it reaches the mixture of hydrogen sulfide and polyfluoroacetylene should be at least 100 e.v. The dosage or quantity of radiation employed as accelerated electrons, β-particles, X-rays, or gamma rays must be at least $10^4$ rads to produce useful results. A rad is the quantity of radiation which will result in an energy absorption of 100 ergs per gram of irradiated material.

The irradiation may be carried out at any convenient rate of energy input and the time of exposure will be determined by the "dose rate" and the total dosage or quantity of radiation used. The dosage should not be such as to degrade the products formed.

As previously stated, the polyfluoroacetylenes employed in the process of this invention correspond to $R_fC \equiv CR$, in which R is hydrogen or polyfluorocarbyl of up to 10 carbons and $R_f$ is polyfluorocarbyl of up to 10 carbons. Specific polyfluoroacetylenes of this type include 1,1,1-trifluoropropyne, 1,1-difluoropropyne, 1,1,1,4,4,4-hexafluorobutyne-2, 1,1,1,2,2,3,3-heptafluoropentyne, perfluoro-3-heptyne, perfluoro-2-pentyne, perfluoro-2-hexyne, perfluoro-3-hexyne, 4-trifluoromethylperfluoro-2-pentyne, perfluoro-2-butyne and the like.

Theoretically the polyfluoroacetylene and hydrogen sulfide react in 1:1 molar ratio. Practically an excess of hydrogen sulfide over the polyfluoroalkylacetylene is charged to the reactor. The excess can be two or more fold the theoretically required quantity. The excess of hydrogen sulfide is vented to the atmosphere after reaction is complete.

The temperature utilized is usually ambient. If desired, however, low temperatures in the range of −80° C. and below and up to the decomposition temperature of the fluorinated alkenylthiol can be used.

The process is generally operated in closed reactors at autogenous pressures. The process can also be operated as a continuous operation by passing the mixture of hydrogen sulfide and polyfluoroacetylene under pressure through a tubular reactor enclosing the radiation source, followed by separation of desired product and recyclization of unreacted starting materials.

In its composition of matter aspects, this invention provides novel polyfluoroalkenylthiols of the formula:

$$R_fHC=C(SH)Y$$

wherein $R_f$ is polyfluorocarbyl, especially of up to 10 carbons, and Y is hydrogen or polyfluorocarbyl of up to 10 carbons. These polyfluoroalkenylthiols are versatile chemicals, being readily converted to useful sulfides, disulfides, and sulfenyl chlorides, and being tautomers of thioaldehydes and thioketones undergo polymerization to cyclic and/or straight-chain sulfides.

There follow some examples which illustrate but do not limit this invention. In them, pressures are autogenous, and the temperatures are ambient, unless otherwise stated.

Example I

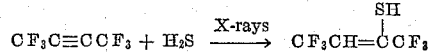

A mixture of 18 grams of perfluorobutyne-2 and 15 grams of hydrogen sulfide was charged into a 100 ml. stainless steel reactor and irradiated with X-rays for three hours at room temperature at an average dose rate of 48,000 rads/minute. After removal of volatile products, the liquid residue was distilled. There was obtained 2 grams (9% of theory) of 1,1,1,4,4,4-hexafluoro-2-mercaptobutene-2, B.P. 52–58° C.; $n_D^{22°\ C.}$, 1.339.

*Analysis.*—Calcd. for $C_4H_2F_6S$: S, 16.35; F, 58.13. Found: S, 16.31; F, 58.06.

Infrared examination of the product showed absorption at 3.25μ (=CH), 3.85μ (—SH), 6.05μ (C=C), and in the 7.5 to 9.0μ region (CF). These data together with the nuclear magnetic resonance spectrum are consistent with the structure of 1,1,1,4,4,4-hexafluoro-2-mercaptobutene-2.

A polymeric product is obtained on vacuum pyrolysis of the 1,1,1,4,4,4-hexafluoro-2-mercaptobutene-2 produced as above, as shown below:

A 2.5 gram sample of the 1,1,1,4,4,4-hexafluoro-2-mercaptobutene-2 was passed under vacuum through a quartz tube packed with glass rings and heated at 350° C. The pyrolytic products were collected in a trap cooled to −80° C. with a solid carbon dioxide-acetone mixture, followed by a trap cooled to −178° C. with nitrogen. At the completion of the pyrolysis, the −80° C. trap was removed and the volatile components of the contents permitted to distill into the −178° C. trap. There remained in the −80° C. trap a polymeric film, which was removed, washed with chloroform, and dried. The −178° C. trap contained principally unpyrolyzed 1,1,1,4,4,4-hexafluoro-2-mercaptobutene-2.

*Example II*

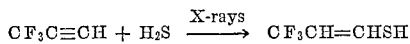

A mixture of 20 grams of 3,3,3-trifluoropropyne and 25 grams of hydrogen sulfide was charged into a 100 ml. stainless steel reactor and irradiated with X-rays for four hours at room temperature at an average dose rate of 20,000 rads/minute. After removal of volatile products, there remained 3.1 grams of a yellow liquid. The liquid products from five such runs were combined and distilled through a low-temperature, helices-packed column. There was obtained 9.5 grams of 1-mercapto-3,3,3-trifluoropropene, B.P. 21–22° C./138 mm.; $n_D^{23°\,C.}$, 1.389.

*Analysis.*—Calcd. for $C_3H_3F_3S$: S, 25.00; F, 44.50. Found: S, 25.45; F, 44.17.

Infrared examination showed absorption at $3.25\mu$ (=CH), $3.8\mu$ (—SH), $6.1\mu$ (C=C), and in the 7.5 to $9.0\mu$ region (—CF). These data are consistent with the structure of 1-mercapto-3,3,3-trifluoropropene.

A higher boiling material (5 grams) consisting principally of 3,3,3-trifluoro-1,2-propanedithiol was also isolated from the reaction mixture.

The polyfluoroalkenylthiols produced in accord with this invention are active solvents for low molecular weight polytetrafluoroethylene and the resulting solutions are useful in the coating of bibulous substrates, e.g., paper, to impart water-proofness, as shown below:

Low molecular weight polytetrafluoroethylene was readily dissolved in 1,1,1,4,4,4-hexafluoro-2-mercaptobutene-2, on warming. Strips of filter paper and of wood were made water-proof by treatment with this solution and subsequent evaporation of the solvent.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula XCH=C(SH)Y, wherein Y is selected from the group consisting of hydrogen and polyfluorocarbyl of up to 10 carbons and X is polyfluorocarbyl of up to 10 carbons.
2. 1,1,1,4,4,4-hexafluoro-2-mercaptobutene-2.
3. 1-mercapto-3,3,3-trifluoropropene.

References Cited in the file of this patent

UNITED STATES PATENTS

| | | |
|---|---|---|
| 2,398,480 | Vaughan et al. | Apr. 16, 1946 |
| 2,619,508 | Mikeska et al. | Nov. 25, 1952 |
| 2,806,884 | Tapp et al. | Sept. 17, 1957 |
| 2,886,501 | Hasselstrom et al. | May 12, 1959 |
| 2,898,277 | Harteck et al. | Aug. 4, 1959 |

OTHER REFERENCES

Haszeldine et al.: J. Chem. Soc. (London), 1952, 3483–3490.

Haszeldine et al.: J. Chem. Soc. (London), 1952, 3490–3498.

Martin: Chem. and Eng. News 33, 1424–1428 (1955).